Jan. 23, 1945.  H. F. STIFFLER  2,368,079
PHOTOGRAPHIC NEGATIVE HOLDER
Filed Sept. 10, 1943  2 Sheets-Sheet 2

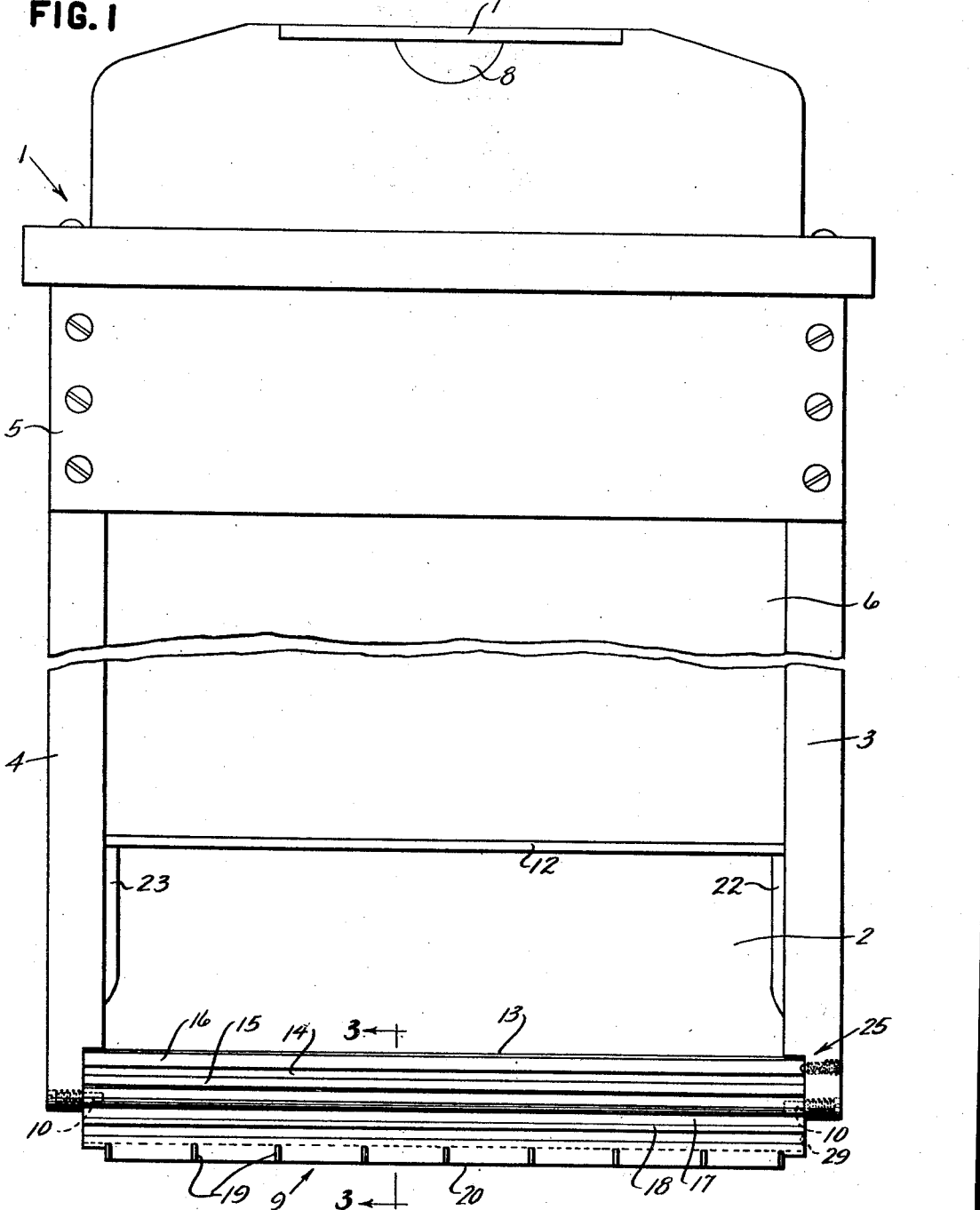

INVENTOR
HAROLD F. STIFFLER
BY
ATTORNEYS

Patented Jan. 23, 1945

2,368,079

UNITED STATES PATENT OFFICE 2,368,079

PHOTOGRAPHIC NEGATIVE HOLDER

Harold F. Stiffler, Medway, Ohio

Application September 10, 1943, Serial No. 501,762

5 Claims. (Cl. 95—90)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to photographic negative holders and, more particularly, to the improvement of a standard type of cut film holder adapted for detachable cooperation with a photographic camera for holding the film or negative in image receiving position in the camera when the holder is cooperably associated therewith.

The type of photographic negative holder to which the invention has particular relation comprises a light-tight enclosing frame for receiving a negative therewithin, a slide member slidably associated with said frame and slidable relative thereto to a position covering the negative and also to its position uncovering the negative to expose the same, and a door hinged to the frame and cooperable with said slide member in light-tight interrelation therewith.

The principal object of the invention is to modify this type of film or negative holder so that it may be utilized to handle the negative during the developing process upon removal from the camera as well as during the process of exposing the negative in the camera, whereby to provide a film holder of the above type which is capable of handling the film, in daylight and without the use of a dark room, throughout the entire process from insertion of the film or negative in the camera to the completion of the development of the film or negative.

Incidental to the foregoing, it is an object of the invention to modify the above type of film holder in a simple, inexpensive, and practical manner to provide a light-excluding liquid passage from the outside of the holder to the interior thereof, whereby developing solutions may be rapidly introduced to and removed from contact with the negative while light is prevented from contacting the negative so that the latter may be safely handled in the holder in daylight under all conditions.

In carrying the invention into practice, as illustrated herein, this particular improvement involves the provision of a tortuous passage communicating with the outside of the negative holder and with the interior thereof between the door and the frame, said passage enabling free and rapid flow of liquid therethrough while preventing the transmission of light therethrough. The passage is formed by providing the door and the frame with portions cooperating in spaced, overlapped relation when the door is in closed position. Specifically, in the embodiment of the invention herein disclosed, said cooperating portions constitute baffles interposed in said passage in spaced, overlapped relation to prevent the transmission of light through said passage while permitting free flow of liquid therethrough.

Another object of the invention resides in the provision of automatic locking means for positively maintaining the door in closed position.

I am aware of the fact that it has been heretofore proposed to provide negative holders with light excluding liquid passages, as illustrated in the United States patents of Unger, No. 650,622 and Pope, No. 1,602,931. However, the construction of negative holder to which my invention relates, and the problems involved in the provision of such a passage therein, are both quite different. I, therefore, make no claim to the subject matter of the above patents or to constructions similar thereto, but only to the construction defined by the appended claims.

The invention will now be more particularly described in connection with the accompanying drawings, in which Figure 1 is an elevational view of a film holder embodying my invention, showing the slidable member partially withdrawn and the door in open position;

Figure 4:
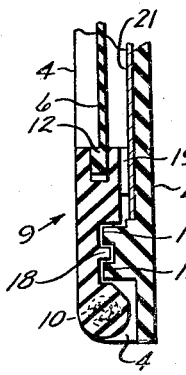
Figure 4 is a sectional view similar to Figure 3, showing the door in closed condition and the slide member in light-tight interrelation therewith.
Figure 3:
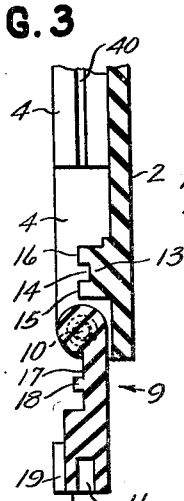
Figure 3 is a sectional view taken on the line 3—3 of Figure 1, looking in the direction of the arrows.

Now referring to the drawings for a detailed description of the invention, the film or negative holder generally designated by the numeral 1 is comprised of an enclosing frame consisting of a back member 2, side frame members 3 and 4, and a front frame member 5, the parts 2, 3, 4, and 5 being suitably secured together to form an integral holder unit. A slide member 6 is slidably associated with the enclosing frame, the side edges of the slide member or plate 6 being slidably received for this purpose in suitable grooves or recesses 40 provided in the side frame members 3 and 4. The upper end of the slide member 6 is provided with a hand-engaging portion 7 and cut out to provide an opening 8 for facilitating finger engagement to manipulate the slidable member 6. The upper end of the slide member 6 extends through an opening in the upper end of the frame provided intermediate the back and front frame members 2 and 5.

The slide member 6 fits the frame closely so that no light can be transmitted around its edges to the interior of the frame when the slide member 6 and the door 9 are in their closed positions and the slide member 6 is in cooperative relation to the door 9. The door 9 is hinged to side frame members 3 and 4 by the provision of the hinge pins 10 associated with the side members 3 and 4, and the door 9 is provided with a groove 11 adapted to receive the thickened end 12 of the slide member 6 in light-tight interrelation as shown in Figure 4 when the door 9 and slide member 6 are in fully closed cooperative relation.

The door 9 and the back frame member 2 are provided with portions cooperating in spaced, overlapped relation when the door is in closed position to provide a tortuous passage between the frame and the door, said portions permitting the flow of liquid through said passage while preventing the transmission of light therethrough. To this end, the back frame member 2 is provided with a thickened or raised portion 13 extending transversely across the back frame member 2 adjacent the hinge axis of the door 9, and said portion 13 is provided with a groove or recess 14 extending transversely of the back frame member 2 and forming raised ridges or baffles 15 and 16 on either side of the groove or recess 14. The door 9 has a reduced or recessed portion 17 adapted to receive the raised portion 13 of the back frame member 2, and centrally of the reduced portion 17 there is provided a ridge or tongue constituting a baffle 18 adapted to be received within the groove or recess 14 when the door is in closed position, as shown in Figure 4.

The raised portion 13 is spaced from the recessed portion 17, and likewise the ridge or tongue 18 is spaced from the walls of the groove or recess 14 when the door 9 is in closed position, as shown in Figure 4, so that there is provided a light-excluding liquid passage extending from the interior of the frame or holder intermediate the back frame member 2 and the slide member 6 and between the back frame member 2 and the door 9, between the hinge portion of the door and the back frame member 2 to the outside of the holder frame, when the door 9 is in closed position and the slide member 6 is in light-tight interrelation with the door 9 in the condition indicated by Figure 4. The light-excluding liquid passage just described is clearly evident from Figure 4. It will be apparent that this passage lies partially in the frame and partially in the door and is formed by the spaced, overlapped interrelation of the respective mating and cooperating recesses and raised or ridge portions or baffles. It will be noted that, when the door 9 is in the closed position of Figure 4, the baffle elements 15 and 16 are not only spaced from one another but each is spaced from the baffle element 18 and in overlapped relation thereto; and the baffles 15 and 16 are in spaced, overlapped relation to the hinge portion of the door 9 and are also in that relation to the upper wall of the recessed portion 17 above the baffle 18.

The door 9 is provided with a series of short ridges 19 on the inner side of the door adjacent the free or recessed edge 20 thereof. When the door 9 is in closed position, as shown in Figure 4, the ridges 19 engage the film or negative 21 which has been positioned against the back frame member 2 and these ridges 19 therefore serve as abutments to control the extent of inward movement of the door 9 to closed position so that the adjacent portions of the door 9 and back frame member 2 are maintained in properly spaced relation to provide the liquid passage from the interior of the frame of the holder between the door and frame to the outside as above described. The side frame members 3 and 4 are provided with inwardly extending flanges 22 and 23, respectively, spaced from the back frame member 2 sufficiently so that the edges of the film or negative 21 may be received between the flanges 23 and the back frame member 2. In practice, the film or negative 21 is slid into position between the flanges 22 and 23 and the back frame member 2, and the film or negative 21 is thus held in proper position in the film holder by the close engagement of the flanges 22 and 23 with the edges of the film or negative 21. It will be apparent that the ridges 19 do not obstruct the flow of liquid between the interior of the frame of the holder and the outside thereof since the liquid may flow between the spaced ridges 19.

Figure 5:
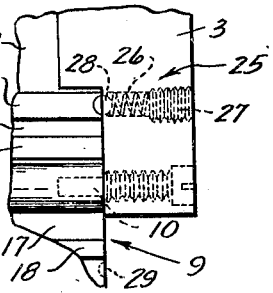
Figure 5 is an enlarged detail view of one corner of the film holder at the door end thereof, showing more particularly the door hinge and locking means.

Locking means is provided for maintaining the door 9 in the closed condition of Figure 4, said locking means comprising a spring-pressed detent generally indicated by the numeral 25 and best seen in Figure 5 as comprising a spring 26 housed in a suitable passage in the side frame member 3 and engaging an adjusting screw 27 and also engaging a ball 28 suitably retained on the frame member 3 and protruding therefrom into the path of the door 9 as the latter is moved to the closed condition of Figure 4, the door 9 having its adjacent side edge provided with a suitable opening 29 to receive the protruding portion of the spring-pressed ball 28 when the door 9 is moved to the closed condition of Figure 4.

Figure 2:
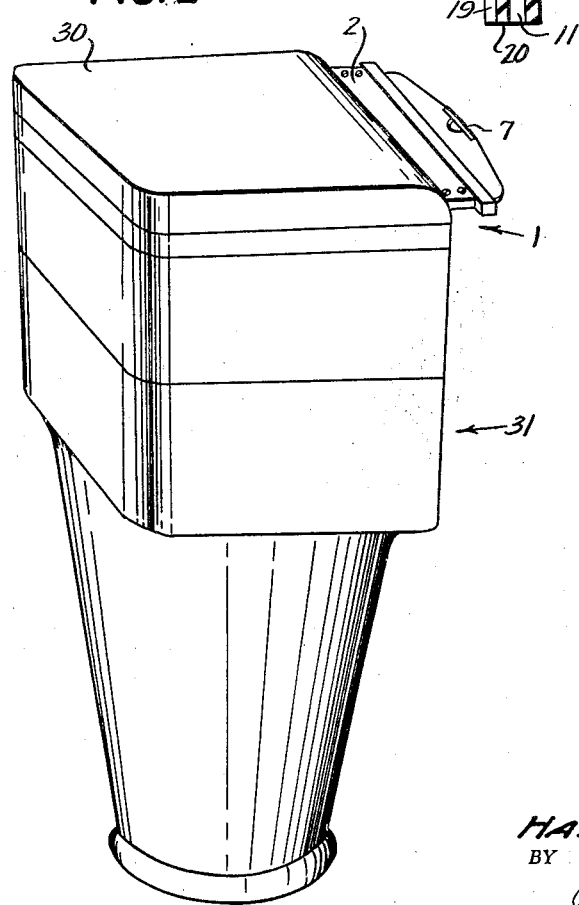
Figure 2 is a perspective view of a camera showing the film holder in association therewith and partly withdrawn therefrom.

In the use of my invention a film or negative 21 is placed within the film holder 1 in the manner above described, the door 9 is closed and the slide member 6 is moved into light-tight interrelation with the door 9, as shown in Figure 4. The film holder 1 is then placed within the magazine 30 of a camera 31, this being illustrated in Figure 2 wherein the film holder 1 is shown partially withdrawn from the camera. In the taking of a photograph the slide member 6 must be withdrawn upwardly, having reference to Figure 1, to expose the film or negative 21, the flange 12 at the bottom edge of the slide 6 serving as an abutment to limit the upward movement of the slide 6. When the negative or film 21 has been exposed within the camera, the entire film holder 1 may be withdrawn from the camera 31, the slide member 6 having been restored to light-tight interrelation with the door 9, as shown in Figure 4, following exposure of the negative and prior to withdrawing the film holder from the camera.

The film holder 1, having been withdrawn from the camera in the condition just described, may be immersed successively in the respective developing, fixing, and washing solutions for the carrying out of the process of developing the film or negative 21 in daylight without the use of a dark room and without removing the film 21 from the film holder 1. The liquid passage between the door 9 and the back frame member 2 to the interior of the film holder intermediate the slide member 6 and the back frame member 2 is sufficiently large to permit the rapid introduction of the respective developing, fixing, and washing solutions into contact with the exposed negative or film 21 within the film holder 1 when the latter is immersed in one of the respective solutions with the slide 6 and door 9 in fully closed, light-tight interrelation. Usually, however, the film holder will be immersed in the solution sufficiently so that a portion of the front frame member 5 is below the level of the liquid, the film holder being positioned in the solution with the hand-engaging portion 7 of the slide member 6 upward and extending above the level of the liquid. With the film holder 1 thus positioned in the solution more rapid introduction of the solution into contact with the exposed film or negative 21 may be accomplished by withdrawing or moving the slide member 6 upward while maintaining a portion of the front frame member 5 below the level of the liquid.

When the film or negative 21 has been exposed to contact with the solution for the desired length of time, the slide member 6 may be restored to light-tight interrelation with the door 9, as illustrated in Figure 4. and the film holder 1 then withdrawn from the solution. The film holder 1 being held with the door end downward, it will be apparent that the solution remaining in the interior of the film holder between the slide member 6 and the back member 2 will rapidly drain out of the film holder 1 through the liquid passage provided intermediate the door 9 and back frame 2.

Thus, it will be seen that, while liquid may pass to or from the interior of the film holder 1 to or from the outside thereof, no light can be transmitted through the passage intermediate the door 9 and back frame member 2 to the interior of the film holder so as to spoil the exposed film or negative when the door 9 and slide member 6 are in light-tight interrelation, although liquid may readily flow through said passage, light from the outside of the film holder being prevented from being transmitted through said liquid passage by reason of the interposition of baffles 15, 16 and 18 in said passage to compel the liquid to flow in a tortuous or sinuous course with resultant exclusion of light rays from the interior of the film holder.

Having thus described my invention, what I claim as new and desired to secure by United States Letters Patent is:

1. A photographic negative holder comprising a light-tight enclosing frame for receiving a photographic negative therewithin, a slide member slidably associated with said frame and slidable relative thereto to a position covering the negative and also to a position uncovering the negative for exposure thereof, a door hinged to said frame and cooperable with said slide member for light-tight interrelation therewith, said door and said frame being provided with portions cooperating in spaced, overlapped relation when the door is in closed position to provide a tortuous passage between the frame and door, said passage communicating with the interior of said frame and with the outside thereof, said portions permitting the flow of liquid through said passage while preventing the transmission of light therethrough when the door is in closed position.

2. A photographic negative holder comprising a light-tight enclosing frame for receiving a photographic negative therewithin, a slide member slidably associated with said frame and slidable relative thereto to a position covering the negative and also to a position uncovering the negative for exposure thereof, a door hinged to said frame and cooperable with said slide member for light-tight interrelation therewith, said door being arranged with respect to said frame so as to provide a passage between the frame and the door when the latter is in closed position, said passage providing communication between the interior of said frame and the outside thereof and permitting the flow of liquid therethrough, and baffle means positioned in said passage, said baffle means being arranged to prevent the transmission of light through said passage while permitting the free flow of liquid therethrough when the door is in closed position.

3. A photographic negative holder adapted for detachable association with a camera for holding a photographic negative in image receiving position in the camera when the holder is cooperably associated with the camera, said holder comprising a light-tight enclosing frame for receiving a negative therewithin, a slide member slidably associated with said frame and slidable relative thereto to a position covering a negative position within the frame and also slidable to a position uncovering such negative for exposure thereof, a door hinged to said frame and cooperable with said slide for light-tight interrelation therewith, said door having a portion adjacent to the hinge spaced from said frame to provide a passage between the frame and the door when the door and the slide member are in light-tight interrelation, said passage providing communication between the interior of said frame and the outside thereof and enabling the flow of liquid through said passage, and baffle means positioned in said passage when the door is in closed condition, said baffle means comprising baffle elements arranged in spaced overlapped relation to prevent the transmission of light through said passage while permitting free flow of liquid therethrough when the door is in closed condition.

4. A photographic negative holder as claimed in claim 2 wherein the baffle means comprises a baffle element on said door and a baffle element on said frame, said baffle elements being positioned in spaced overlapped relation when the door is in closed condition.

5. A photographic negative holder as claimed in claim 1 wherein said portions comprise tongue and groove elements on the door and the frame, said elements being arranged so that when the door is in closed position the tongue element lies within and spaced from the walls of the groove element.

HAROLD F. STIFFLER.